US005976670A

United States Patent [19]

Fugazzi

[11] Patent Number: 5,976,670

[45] Date of Patent: Nov. 2, 1999

[54] SOLID SURFACE COMPOSITE AND METHOD OF PRODUCTION

[75] Inventor: Robert Anthony Fugazzi, Cincinnati, Ohio

[73] Assignee: Architectural Precast, Inc., Columbus, Ohio

[21] Appl. No.: 09/074,817

[22] Filed: May 8, 1998

[51] Int. Cl.[6] .............................. B32B 3/00; E04C 1/00

[52] U.S. Cl. ......................... 428/161; 428/172; 428/215; 52/309.17

[58] Field of Search .................................... 428/156, 172, 428/215, 161, 163, 45, 47, 70, 120, 658; 52/309.17, 389, 605

[56] References Cited

U.S. PATENT DOCUMENTS

| | | | |
|---|---|---|---|
| 3,812,636 | 5/1974 | Albrecht et al. | 52/334 |
| 4,049,874 | 9/1977 | Aoyama et al. . | |
| 4,166,347 | 9/1979 | Pohlman et al. | 52/223 R |
| 4,213,929 | 7/1980 | Dobson | 52/577 |
| 4,292,364 | 9/1981 | Wesch et al. | 428/286 |
| 4,453,359 | 6/1984 | Robinson | 52/389 |
| 4,711,799 | 12/1987 | Gove . | |
| 4,774,045 | 9/1988 | Kushida et al. . | |
| 5,063,093 | 11/1991 | Mentzer . | |
| 5,135,206 | 8/1992 | Martinex . | |
| 5,324,031 | 6/1994 | Green . | |
| 5,502,940 | 4/1996 | Fifield . | |
| 5,521,243 | 5/1996 | Minghetti . | |
| 5,567,745 | 10/1996 | Minghetti . | |
| 5,628,949 | 5/1997 | Bordener . | |

OTHER PUBLICATIONS

An article authored by Urs Meier entitled: "Designing and producing materials by combination", *Materials and Structures,* 21 (1988), pp. 85–89.

*Primary Examiner*—Donald Loney

*Attorney, Agent, or Firm*—Donald O. Nickey; Standley & Gilcrest

[57] ABSTRACT

This invention is concerned with the construction of composites useful as horizontal surfaces. The novel composite comprises a fiber reinforced concrete (FRC) as a substrate and a solid surface material (SSM). The novel composite is made through the preparation of a SSM preform and the casting of FRC into the preform. Adhesion between the FRC and the SSM preform is accomplished through the use of a bonding feature (e.g., dove tail slots) cut into the interior surface of the preform or attached to the interior surface of the SSM preform. The invention is also directed to the composites made through the disclosed process.

11 Claims, 4 Drawing Sheets

SOLID SURFACE COMPOSITE AND METHOD OF PRODUCTION

TECHNICAL FIELD

This invention relates to a novel composite for horizontal applications, especially food service furniture, that comprises a fiber reinforced concrete (FRC) and a solid surface material (SSM). The SSM is formed into a mold comprising at least one bonding feature and has FRC poured into it. The invention also relates to a process for the manufacture of the composite.

BACKGROUND OF THE INVENTION

Food service furniture, such as tables and countertops, must possess certain characteristics for acceptable use. One such characteristic is cleanability. Exposure to cleaning agents, abrasives, cutting utensils and the like over a number of years can badly damage most materials used for countertops, table tops, vanity tops and the like. At present, commercial and residential food service furniture is constructed of metal (i.e., stainless steel), plastic laminates (i.e., Formica), marble, wood, mineral-filled resins and the like. The use of laminates and wood for food service furniture has been accepted for years, however, it is subject to deterioration (i.e., scratching and burning) and, as an eating surface, it is difficult to clean due to its porous character. Metal surfaces have been used in the past, however, they are expensive, require significant maintenance and are not favored in residential kitchen and bathroom settings.

One surface material that has recently gained favor is the solid surface or cultured marble material. The term “solid surface” pertains to a material where there is no painted or laminated skin or outer surface. With solid surface materials, small scratches, burns and the like are simply sanded or buffed out.

The industry for solid surfacing began about 25 years ago when duPont, Inc. developed a high quality surface material known commercially as Corian®. Since the early 1980’s, several major manufacturers have developed their own brand of solid surface products. For the most part, these products are expensive to produce and are utilized by cutting a sheet of the SSM into the desired shape and then grinding edges and/or bonding other features through the use of an adhesive. A major cost associated with solid surface materials is that for horizontal applications (i.e., table tops, vanity top, kitchen countertops), the manufacturers recommend, and will only guarantee, thickness of ½ inch or greater. The manufacturers have determined that for horizontal applications, thicknesses of less than ½ inch are subject to cracking and compression failure even when applied to a substrate such as wood or particle board. Further, solid surface materials do not adhere to substrates such as steel or aluminum and thus separation of the composite results in cracking or impact damage. The industry has attempted to reduce the costs of SSM horizontal surfaces through reducing the thickness of the solid surface material without success. Bonding of solid surface materials with a thickness of less than ½ inch to conventional substrates has failed to convince the solid surface manufacturers that warranties, expected by the consumer, can be granted.

In its most general aspect, the present invention uses a fiber reinforced concrete (FRC) and a bonding feature to address the shortcomings of the prior art substrate materials for solid surface materials. The solid surface material (SSM) is highly desirable as it provides a surface that is non-porous, resistant to staining, easily cleaned and resistant to environmental degradation. The FRC provides the required mass, impact resistance, structural strength and a low cost of production. An additional aspect of the invention relates to a process for manufacturing the composite wherein the interior surface (surface in contact with the concrete substrate) of the SSM comprises a bonding feature to assure proper bonding of the SSM to the concrete substrate. While the use of wooden substrates for SSM is known, the countertop, vanity and table industries have failed to appreciate the numerous advantages that FRC/SSM composites can bring to food service and bathroom furniture. One possible reason for overlooking the FRC/SSM composite is the lack of adhesion between such dissimilar materials. One aspect of this invention is the discovery that certain structural features of the inventive composite will overcome this adhesion problem. A further aspect of the invention relates to methods of producing such FRC/SSM composites.

BACKGROUND ART

Urs Meier authored an article entitled: “Designing and producing materials by combination”, *Materials and Structures,* 21, (1988), pp. 85–89 and discloses a combination of polyethylene and concrete by mechanical interlocking for chemical resistant sewer pipe. This reference also discusses the application of carbon fiber reinforced epoxy laminates to concrete beams. The article fails to suggest or disclose a FRC/SSM composite for food service furniture and also fails to suggest the forming of SSM into a mold into which wet concrete is poured.

U.S. Pat. No. 5,628,949 to Bordener discloses a mold process for producing a finished solid surface countertop. The Bordener process includes placing a high quality resin in a mold and then adding a low grade plasticized material filled with calcium carbonate as a substrate. This patent fails to suggest that a preformed SSM with a thickness of less than about ½ inch and greater than about ⅛ inch can have cast upon it FRC.

Minghetti et al., in U.S. Pat. Nos. 5,567,745; 5,521,243 and 4,840,833 discloses a special Corian® that can be bent through the application of heat. This patent teaches that alumina trihydrate is used in polymethylmethacrylate articles for its flame retardant properties and that inclusion of fumed silica into the synthetic mineral sheet will allow for thermoforming at a minimum bending radius of less than 3 inches. This patent fails to suggest or disclose the combination of thermoformable SSM with fiber reinforced concrete to reduce costs and improve durability. The teachings of U.S. Pat. Nos. 5,567,745; 5,521,243 and 4,840,833 are incorporated herein by reference.

U.S. Pat. No. 5,063,093 to Mentzer relates to a simulated marble and a process for its preparation. This patent teaches casting a chemical-filled polymeric material, e.g., calcium carbonate-filled acrylic polymer (e.g., Corian® registered by the E. I. dupont de Nemours & Co.), onto a stationary or moving surface having deposits of a solid chemical reactive with the calcium carbonate in the polymeric material so as to emit a gas to form indentations or fissures in the solidifying polymeric material. This patent makes no mention of concrete as a substrate or how one can overcome the problems associated with thin (less than ½ inch) SSM sheets in a horizontal application.

U.S. Pat. No. 5,502,940 to Fifield discloses a composite roofing element comprising a first layer of aggregate based material and a second layer of material having a density less than that of the first layer. This patent suggests that the surface of one of the layers may be provided with one or more dovetailed ridges and the corresponding surface of the other layer is provided with one or more complimentary dovetailed channels so that the dovetailed channels of the other layer retain the dovetail ridges of the first mentioned layer. The first layer is disclosed as being concrete and the second layer is, for example, an expanded polymer such as polystyrene or polyurethane. The second layer of polystyrene has cast upon it the concrete. This reference makes no suggestion of the casting of FRC concrete into a SSM form that has had bonding features cut or placed on its interior surface.

U.S. Pat. No. 5,324,031 to Green discloses a golf putter with a Corian® putterhead apparatus and its method of manufacture. This patent discloses cutting Corian® into various shapes and then bonding the parts with conventional Corian® joint adhesive to form the putter head with a hollow that is filled with lead shot.

U.S. Pat. No. 5,135,206 to Martinez discloses a clamping device for use with materials to be adhered into position where it will be routed to form a cove or other shaped routed joint at the interface of vertical and horizontal surfaces of Corian®-type materials. While this patent is not at all related to the present invention, it does provide a good description of how Corian® sheets can be formed into kitchen countertops and bathroom vanities. In similar fashion, U.S. Pat. No. 4,711,799 discloses an apparatus and method for making a countertop using a rotary motor router.

U.S. Pat. No. 4,774,045 to Kushida et al. discloses a concrete structural member prepared by impregnating the concrete with a monomer and thereafter polymerizing the monomer to form the composite. This reference actually teaches away from the present invention which requires that the wet concrete be poured into the SSM form.

U.S. Pat. No. 4,049,874 to Aoyama et al. relates to a process for producing an architectural precast concrete panel. The process uses a mold into which a methacrylic syrup containing a cross-linking monomer and aggregates are placed. While this mixture is in a non-polymerized states, hydraulic cement is poured over it. A cohesive composite is then formed upon the polymerization of the monomers and the hydration of the cement. This patent points out what lengths are required to obtain a coherent concrete/polymer composite. This patent fails to suggest the approach of the present invention which utilizes the SSM as a form. The SSM has the bonding feature cut into it and then a FRC is poured into the SSM mold. The prior art has failed to suggest such an approach to provide a composite that has many beneficial aspects.

SUMMARY OF THE INVENTION

This invention relates to a novel composite comprising FRC and SSM. More specifically, the invention is directed to food service furniture that comprises a preformed SSM member and FRC, wherein said SSM member comprises a bonding feature at the SSM surface contacting the FRC. The bonding feature may take the form of a slot cut into the SSM or the form of a fixture adhering to the interior surface of the SSM. Preferably, said SSM member comprises a slot element, preferably a trapezoidal slot element, in the interior surface of said SSM member wherein the depth of said slot that is no more than 50% of the thickness of said SSM member. When said bonding feature is a fixture adhering to the interior surface of the SSM, it may be "T" shaped, triangular, "L" shaped and the like. Said bonding feature is preferably present at a level of at least 0.5 linear foot per square foot of surface area of said SSM member. The bonding feature may parallel the outside edge of the SSM member, may take the form of concentric circles and/or may be in the form of diagonal lines, "X"s and the like.

Other aspects and advantages of the invention will be apparent from the following description, the accompanying drawings and appended claims.

DETAILED DESCRIPTION OF THE INVENTION

Figure 1:
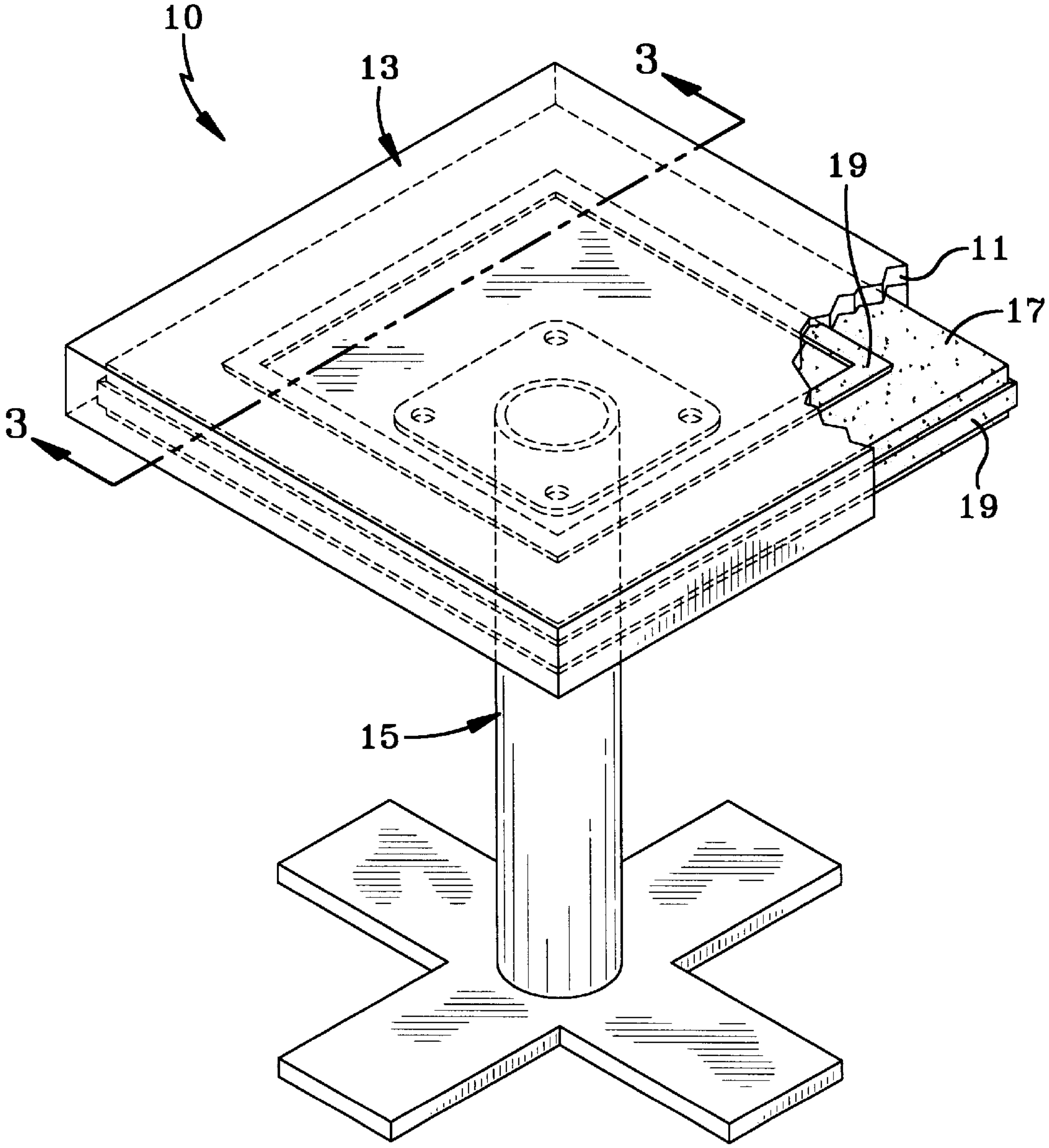
FIG. 1 is a perspective view, partially broken away, of a square table consisting of a table top in accordance with the present invention and a supporting structure partially broken away.

Having reference to the drawings, attention is directed first to FIG. 1 which illustrates a representative table in perspective view and partially broken away embodying this invention designated generally by the numeral 10. The basic components of the table are the stand 15 and table top 13. The table top 13 comprises the FRC/SSM composite according to the invention. In the partial, broken away section, the FRC substrate 17 and the bonding feature 19 can be seen. The SSM covering the table top and edges of the table top is item 11.

Figure 2:
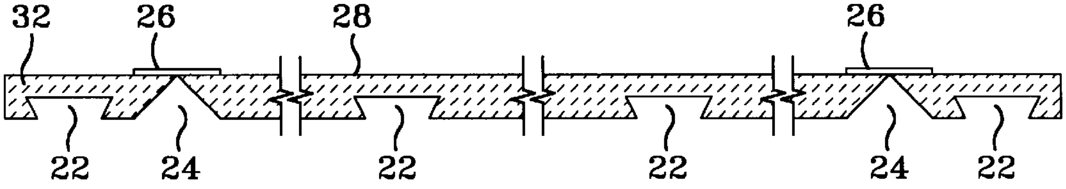
FIG. 2 is a cross sectional view of a SSM sheet just prior to preparation of the SSM mold.

FIG. 2 illustrates a cross sectional view of the SSM member 32. The sheet of SSM has cut into it a bonding feature, herein represented by a dove tail bonding feature 22 and "V" cuts 24 for the creation of the edges of the table top. Tape 26 is placed on the exterior surface 28 of the SSM element to assist in the preparation of the finished mold. The tape acts as a hinge while gluing the mitered corner and is removed after the curing of the FRC.

Figure 3:
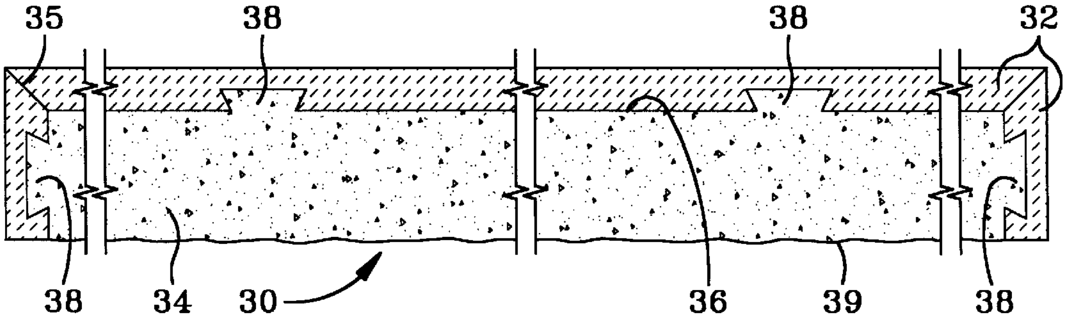
FIG. 3 is a cross sectional view taken along line 3—3 of FIG. 1.

FIG. 3 illustrates the table top 10 in cross section taken along line 3—3 of FIG. 1. This Fig. illustrates that the FRC/SSM composite 30 is generally rectangular in cross section. The FRC/SSM composite 30 comprises the SSM member 32 as seen in FIG. 2 with the "V" cuts 24 being closed to form a 90° corner 35 and the FRC substrate 34. The inner surface 36 of the SSM member 32 has bonding features 38 cut into it. In this embodiment, the bonding feature is represented by a "dove tail" cut of about ⅜" at its widest dimension and at a depth of no more than 50% of the thickness of the SSM member 32. The exterior surface of the FRC substrate 39 may be finished or left rather rough as it forms the underside of the table top. The thickness of the SSM member 32 is less than ½", more preferably less than ⅜" and most preferably about ¼" in thickness.

Figure 4:
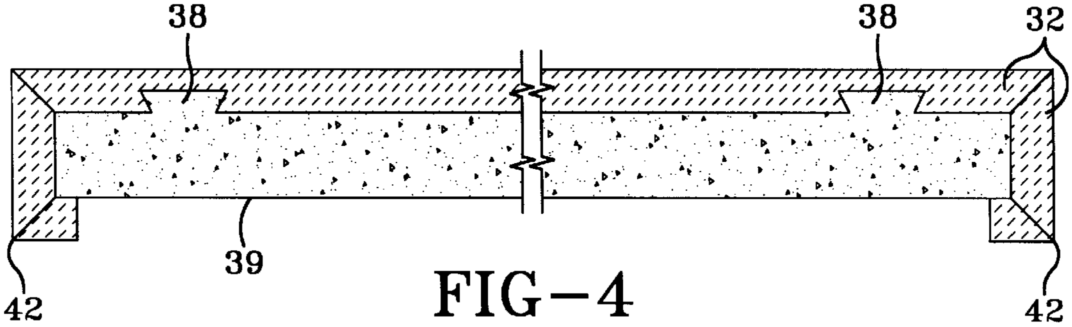
FIG. 4 is a cross sectional view of another embodiment of the invention.

FIG. 4 is another embodiment of the invention in cross sectional view wherein the SSM member 32 comprises an additional set of "V" cuts so that a second 90° C. corner 42 is formed and thus a portion of the SSM member 32 covers a portion of the exterior surface 39 of the FRC substrate.

Figure 5:
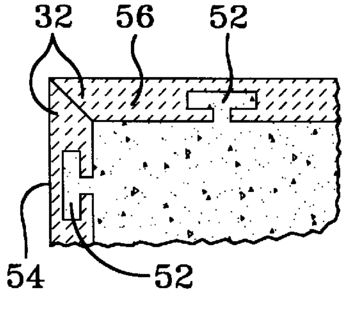
FIG. 5 is a cross sectional view of yet another embodiment of the invention.

FIG. 5 is yet another embodiment of the invention wherein the SSM member 32 has a "T" shaped bonding feature 52 in the edge 54 and top 56 portion of the SSM member.

Figure 6:
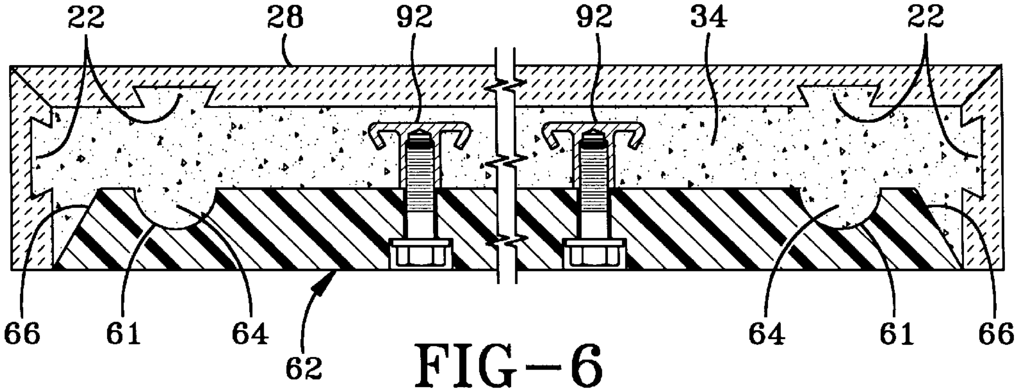
FIG. 6 is a cross sectional view of the composite in conjunction with a blank that is optionally used during construction of the composite.

FIG. 6 is the composite of the invention shown in cross section with the blank 62 used during the formation of the composite. The blank 62 comprises cut out 61 which create reinforcement ridges 64 in the FRC substrate 34. The blank 62 also comprises side walls 66 that taper towards the center of the blank. These tapers allow the blank to be easily removed from the composite after the FRC 34 has cured and also reinforces the edge of the SSM with additional FRC.

Figure 7:
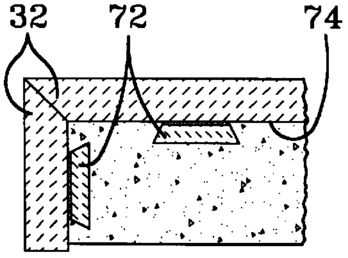
FIG. 7 is a cross sectional view of an embodiment of the invention wherein the bonding feature adheres to the interior surface of the SSM.

FIG. 7 is an embodiment of the invention wherein the bonding feature is a trapezoid 72 adhering to the interior surface 74 of the SSM member 32.

Figure 8:
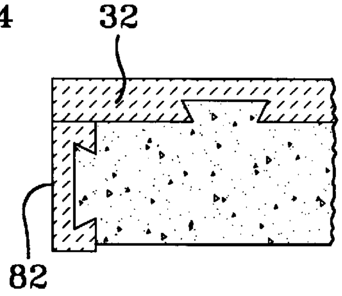
FIG. 8 is a cross sectional view of an embodiment of the invention wherein the SSM mold is formed through a butt joint of the top and side surfaces.

FIG. 8 is yet another embodiment of the invention wherein the mitered corner 35 of FIG. 3 is replaced with a butt joint 82.

Figure 9:
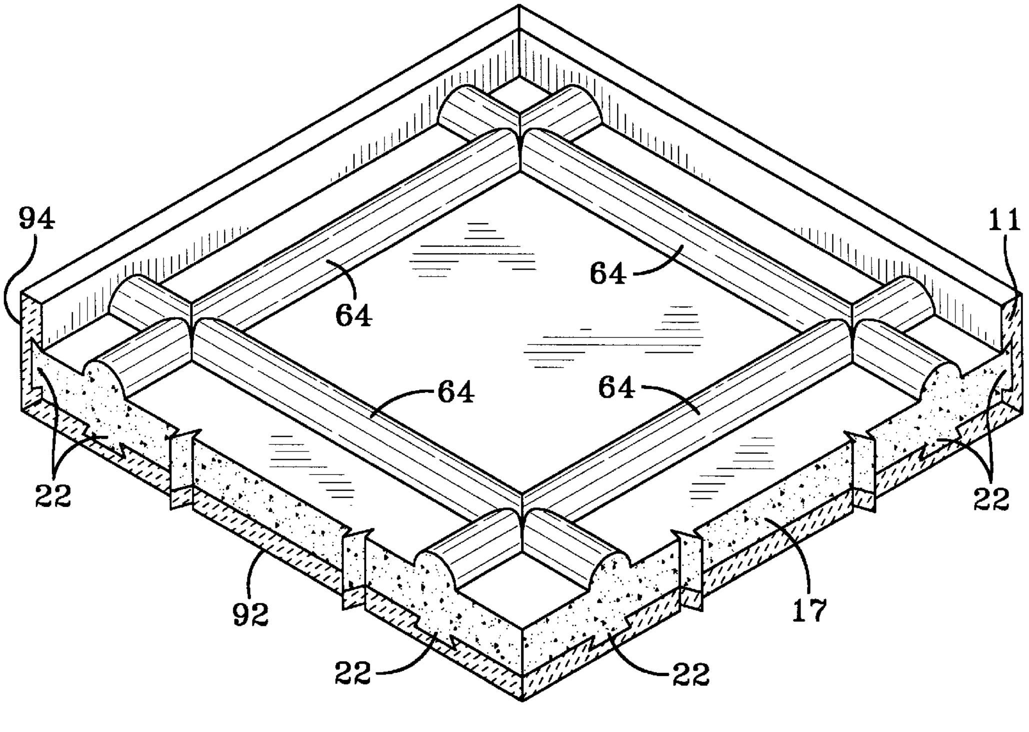
FIG. 9 is a perspective bottom view, in partial cross section, of an embodiment of the invention.

FIG. 9 is a perspective view of the bottom of the composite wherein the FRC substrate 17 comprises reinforcement ridge 64 and dovetail bonding features 22. The SSM 11 forms the top 92 and edges 94 of the composite.

Figure 10:
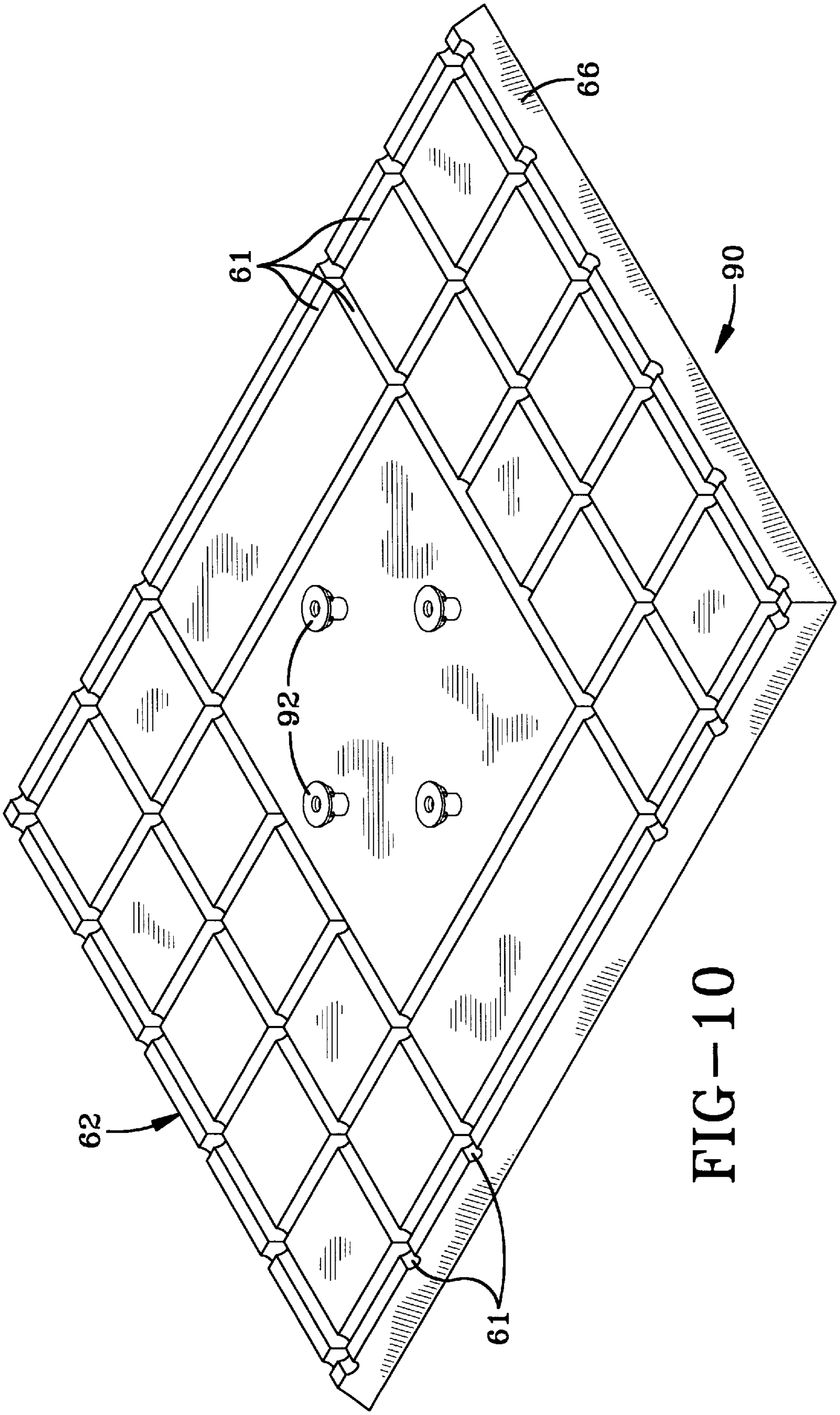
FIG. 10 is a perspective view of the blank used in preparing the composite according to the invention.

FIG. 10 is a perspective view of the blank optionally used to form the composite. The blank, generally 90, can be made of any material that will not adhere to the FRC. Preferably, the blank 90 is made of SSM or PVC, as they will not adhere to the FRC and cut outs 61 can be easily made through the use of a router. "T" nuts 92 are positioned in the blank such that upon placement of the blank in the wet FRC and curing of the FRC, the "T" nut will remain in the FRC substrate 34 of FIG. 6. The blank 90 is dimensioned so as to fit with the SSM form and possesses side walls 66 which are beveled to facilitate easy removal of the blank after curing of the FRC and reinforces the edge of the composite with FRC. The angle of the bevel may range from 4–45°. The bevel may also be accomplished through routering the edges of the blank with a quarter round or such configuration. In this embodiment, the bonding features cut into the interior surface of the SSM member would follow the pattern set out in FIG. 10 for the cut outs 61. The concept is to place the reinforcing ridges 64 (see FIG. 6) over the bonding features 22, thus further strengthening the composite.

As used herein and in the claims, the term "concrete" means the artificial stone that is created by mixing aggregate (granular material such as sand and gravel), cement and water. The water and cement form a paste that coats the pieces of aggregate and fills the spaces between them. The water triggers a chemical reaction in the cement that causes it to dry out and set or harden, bonding itself and the aggregate into the hard mass called concrete. The characteristics of concrete vary according to the nature of its aggregate and cement and the proportions in which they are mixed with each other and with water. Preferably, only a fine aggregate is used in the concrete of this invention and is composed of particles that measure about 2 mm or less in diameter, more preferably less than 1 mm in diameter and most preferably less than 0.5 mm in diameter. Graded sand of medium particle size such as "Ottawa" sand and "Best" sand or a mixture of the two may be used. In lieu of or in addition to sand, it is possible to use ground glass, emery powder, broken clay products, marble chips, crushed stone, silica flour, ground slag, fine gravel, trap rock and similar aggregates. A mixture of aggregate size is preferred as it will lessen the void volumes and thereby reduce the amount of cement required to fill the voids.

Air entrained concrete or non-air entrained concrete may be used in this invention. Those skilled in the art know that entrained concrete can be prepared and what agents and at what levels can be used to produce air-entrained concrete. The volume of air entrained in the concrete can range from 0 up to about 10% by volume. Preferably, about 0.1–5% by volume is preferred in the preparation of the composites according to the invention.

One aspect of the present invention resides in the discovery that the use of a concrete substrate will reduce the thickness of the SSM required for effective and warrantable horizontal surface applications. In the process of making the inventive FRC/SSM composite, the wet concrete is poured into the preformed SSM member (mold) and allowed to cure or set slowly. In one embodiment, the curing concrete is kept wet to facilitate curing, i.e., about 7 days.

In a preferred embodiment, the concrete is under pressure while curing. This can be accomplished through placing a blank (see FIG. 6, element 62 and FIG. 10) of material over the wet concrete surface and applying weight. The blank is preferably the SSM or other material that will not adhere to the FRC. The blank should be dimensioned to conform to the exposed surface of the wet FRC. With the blank in place, it is possible to stack the composites while they are curing and thereby avoid the need to keep the concrete surface wet. This stacking procedure is also effective in reducing the tendency of the composite to buckle or wrap during the curing process. The use of a blank with cut outs or grooves (FIG. 6, element 61) is preferred, however, a blank without cut outs will also be effective. The blank may also comprises "T" nuts which are inserted into the wet FRC so as to provide attachment means for a table stand and the like.

The concrete useful in this invention may also be reinforced by allowing it to harden around steel bars or wire. In a more preferred embodiment of the present invention, the steelbase and/or wire reinforcement is omitted and the concrete substrate is fiber reinforced.

The FRC is prepared using fibers that are known in the art. Representative fibers useful in the present invention include carbon fibers, asbestos, acrylic fibers, polyolefins such as polypropylene and polyethylene and glass fibers. U.S. Pat. No. 5,705,233 provides a good discussion of fibers that can be used in cementitious composites. This patent is specifically directed to plasma treatment of fibers to enhance the bonding of the fibers to the cement portion of the composite.

In general, the concrete used in this invention is prepared by combining appropriate amounts of dry ingredients and water that are thoroughly blended together to make a stiff but workable mixture. The wet concrete is then placed into the preformed SSM member which contains at least one bonding feature cut into its interior surface or applied to the interior surface. Preparation of the SSM member is discussed below. The interior surface of the SSM member is preferably free of oil, excess resin and dirt prior to the concrete being poured into the SSM form or member. Preferably, the interior surface of the SSM member has been sanded prior to fabrication into the mold to remove the excess resin. The concrete is either compacted by tamping the surface or by using mechanical vibrators. Excess concrete, if any, is removed by screening, or drawing a straight edge, such as a board, along the top of the SSM mold with a sawing motion. Smoothing, also called floating, and grading are accomplished by gently working the exposed concrete with a light metal, wood or cork tool having a flat surface. Troweling can be used to make the exterior surface of the concrete substrate smooth, however, it has been found that troweling can be omitted if the blank is used. As mentioned above, a blank is then optionally placed over the exposed concrete and pressure is then applied.

An important constituent of the concrete is the cement. There are several classes of hydraulic cements, e.g. gypsum, high alumina cements and Portland cement. As used herein, the term "cement" shall refer to silicate cement compositions including Portland cement, pozyolanic cements, hydraulic limes, fly ash and natural cements. The preferred cement for use in this invention is Portland cement, which is mixture of calcium silica, iron and aluminum minerals. The preparation of Portland cements are well known to the art. There are five (5) types of Portland cement which are available in the United States. Type 1 is used in general concrete construction and is the preferred cement for use in the present invention. The concrete gains considerable strength in seven (7) days and great strength in about twenty-eight (28) days and continues to gain some strength for years. An alternative to the Type I cement useful in this invention is Type II, which resists moderate exposure to sulfate bearing waters. Type III, also called a "high early strength" cement, becomes strong enough for use soon after it is placed. Type IV cement is used to form great masses of concrete such as in dams whereas Type V has very high resistance to sulfate bearing waters. For purposes of the present invention, the most cost effective cement would be Type I wherein adequate strength is achieved without additional costs.

In general, the weight % of cement to water to fine aggregate or sand can vary widely, however, 20–50% by weight cement, 10–20% by weight water and 35–55% by weight fine aggregate (sand) is acceptable. A more preferred mixture comprises about 35–45% by weight cement, about 12–18% by weight water, 40–50% by weight of fine aggregate and about 0.1–15% by weight other components that are discussed below. The fine aggregate particles should be less than 1.0 mm, preferably less than 0.5 mm in diameter.

The concretes used in the present invention may also be colored through the use of pigments that are added to the cement prior to its final grinding or pigments can be added during the mixing of the concrete. Cements and concretes can be almost any color and the use of such colored cements is an aspect of the present invention.

The concrete used in preparing the composites of this invention is preferably a fiber reinforced concrete (FRC). Those skilled in the art appreciate that numerous fibers have been used in concrete to vary the properties of the final products. Fibers such as graphite, glass, polyethylene, polypropylene, asbestos, cellulose, aramid and the like can be used to prepare the FRC used in this invention.

One FRC especially useful as the substrate of this invention is glass fiber reinforced concrete (GRFC). Typically, the glass fibers are blended with wet concrete at levels of from 0.1–10% by weight. Preferably, the weight % of the glass fiber is less than 5 weight percent and most preferably about 3 weight % of the GFRC. The length of the fibers can vary widely with 1 mm to 10 cm being preferred and 1–5 cm being most preferred. The glass fibers act as reinforcing agents which are randomly distributed throughout the concrete matrix. This random, homogeneous distribution serves to reduce the natural tendency of concrete to crack due to tensile stresses induced during the curing process. The glass fibers preferred for use in the preparation of the GFRC are specially formulated glass compositions that exhibit high resistance to the high alkalinity produced by the hydration of the Portland cement. More specifically, the glass fibers should conform to the Glass Fibre Reinforced Cement Association's "Specification for Alkali Resistant Glass Fibre Rovings and Chopped Strands for Reinforcement of Cements and Concretes"—GRCA-5-0105/0286. Representative of the glass fibers useful in the invention is Cem-FIL® glass fibers distributed by Cem-FIL International Ltd. of Merseyside, England. The diameter of the alkali-resistant fibers that are used to prepare the GFRC are well known to those skilled in the art.

Those skilled in the art will appreciate that various ratios and types of cement, aggregate and fibers can be combined to meet varied end product properties. The resulting FRC useful in the present invention must have good compressive and flexural strength and also have a very high impact resistance.

The concrete substrate of the inventive structural element will have a thickness of from about 0.5 cm (about 3/16 inch) to about 3.0 cm (1.25 inch), with 1.0 cm (3/8 inch) to 2.0 cm (3/4 inch) being more preferred and 1.1 to 1.8 cm being most preferred. It should be understood that weight reduction from use of FRC allows savings in handling, storage, transportation and installation of the inventive composite.

As mentioned previously, the concrete may additionally contain certain additives. Preferably, the concrete contains at least a superplasticizer to improve mold filling. Additives which allow very low water levels are called superplasticizers. Commonly used commercially available compounds useful as superplasticizers include sulfonated melamine-formaldehyde condensates, sulfonated naphthalene-formaldehyde condensates, sulphonated polystyrenes and sulfonated styrene/maleic anhydride copolymers of styrene. A discussion of various plasticizers and flow agents can be found in U.S. Pat. No. 4,792,360. The concrete may also contain a latex acrylic polymer to aid in curing.

As used herein and the in the claims, the term "solid surface material" (a.k.a., solid surfacing material) or SSM means a homogeneous, thermoset polymer alloy, comprised of polyester and/or acrylic components containing filler such as aluminum trihydrate. One commercially available SSM is Fountainhead by Nevamar®, manufactured by Nevamar, International Paper, Decorative Products Division of Odenton, Md. Another commercially available SSM is Corian® manufactured by E. I. dupont de Nemours and Company of Wilmington, Del.

SSM is manufactured for interior applications where a decorative, durable, wear and stain resistant surface is desired. Horizontal applications include vanity tops, countertops, residential and commercial furniture, window sills and thresholds. Vertical applications include wall panels, wainscoting, backsplashes, baseboards and bath and shower enclosures. The manufacturers recommend 1/4 inch SSM only for vertical applications due to cracking and impact damage problems. In fact, for horizontal applications, the manufacturers recommend that unsupported horizontal overhangs should be limited to 6 inches for 1/2 inch thickness material and 12 inches for 3/4 inch material.

SSM is commercial available in thicknesses of 1/4, 1/2 and 3/4 inch. Widths of 30 and 36 inches are available at lengths of 85, 98, 121 and 145 inches. The SSM useful in the inventive composites should be less than ½ inch but greater than 1/16 inch in thickness. Preferably, the SSM is less than 3/16 inch in thickness.

One very important property of SSM is that SSM parts can be joined through the use of color coordinated adhesives. Bonded parts are virtually as strong as the virgin material.

This feature is especially attractive for the present invention as the SSM can be made into a form into which the concrete can be poured. Further, SSM can be molded or thermo-formed into various shapes such as bowls and wash basins. These forms could be reduced in thickness and the present invention applied thereto.

The manufacturers have stated that SSM may be installed over vertical substrates such as gypsum board, ceramic tile, plywood and plaster, but make no comment or suggestion of using concrete as a substrate for horizontal applications.

Some typical properties of SSM are set forth below:

| Property | Test Method | Typical Performance |
|---|---|---|
| Physical Characteristics | ASTM D638 | 6,000 psi |
| Tensile strength | ASTM D638 | 0.55% |
| Tensile Elongation | ASTM D760 | 7,500 psi |
| Flexural strength | Barcol, hard scale | 55 |
| Thermal expansion | ASTM D696 | $1.5 \times 10^5$ in/in/F.° |
| Abrasion resistance | CS 221-66 | 0.080 g/100 cyc |
| Color stability | ASTM G53/UVA 1000 hrs. | No change |
| Water Absorption | ASTM D570 (24 hrs.) | 0.015% |
| High temp resistance | NEMA LD3-3.6 | No change |
| Boiling water resistance | NEMA LD3-3.5 | No change |
| Conductive heat resistance | NEMA LD3-3.10 | No change |

One important quality of SSM is that it can be used in residential kitchens as well as commercial food service installations. SSMs are designed to meet NSF Standard 51 (USA) for use in all food and non-food areas. Another important quality of SSM is that it can be bent into complex shapes by thermoforming. The minimum bend radius varies by sheet thickness. The present invention can also be applied to such thermoformed products.

As used herein and in the claims, the term "composite" means the article comprising FRC and SSM. The FRC and the SSM have their own different characteristics and are combined to provide a composite with useful properties for specific application while each component retains its identity. Each of the input materials of the composite serve a specific function in the composite and thus provide the composite with distinctive and improved characteristics.

The development and use of composites goes back to antiquity. Combining two or more high and low carbon irons or steels by skillfully hand-forging them together into a samurai sword with a lightweight, tough blade which could keep its edge is a typical example. Modern technology applies composite technology to fishing poles, aircraft, automobiles and to the thermal protection systems for re-entry from space. The composite of this invention was stimulated by the outstanding properties of SSMs and their high cost. The challenge of the present invention was to combine SSM with a suitable supporting, load-transferring and low cost material to produce an effective and low cost horizontal surface, especially useful in food service applications.

It has been discovered that the design of the SSM preform or mold is critical as SSM will not bond to concrete. More specifically, it has been found that milling a bonding feature into the SSM or attaching a bonding feature to the interior surface of the SSM will provide a mechanical bond between the concrete substrate and the SSM. Preferably, the bonding feature milled (for example by a router) into the SSM will have an interlocking character, such as dovetails and other shapes that are wider at the top than at the bottom. It should be understood that by wider at the "top" means that the bonding feature is wider near the center of the sheet of SSM than the width at the surface of the sheet of SSM. Other useful shapes for the bonding feature include "T"s, tear drops, mushrooms and the like. What is important is that the size of the opening allow the FRC to flow into the slot or bonding feature. It has been determined that an opening of at least ¼ inch is needed for proper penetration of the FRC into the bonding feature. In the embodiment where the bonding feature is attached to the interior surface of the SSM, the feature should be the narrowest at the point of contact with the interior surface of the SSM and wider at the point farthest from the SSM surface. The interior surface of the SSM sheet which will be in contact with the FRC should have the resin rich layer removed through sanding or other mechanical abrasion.

The thickness of the SSM sheet material should be at least ⅛ inch, more preferably 3/16 inch and most preferably ¼ inch. Thicknesses of from ¼ to ½ inch are also useful. Thicknesses of over ½ inch can be used in the present application, however, the advantages of the composite from the cost and weight perspectives begins to diminish.

As discussed previously, the composite of the present invention is especially useful for table tops and countertops. A major advantage of the composite of the present invention is cost. In addition, tables and countertops using the composite of the invention, if properly maintained, will have more than double the life of existing products such as fiberglass, laminated surfaces, wood and the like. The invention is also applicable to complex shapes of SSM that are used, for example, as vanities, bowls and the like. The invention is better understood from the following Examples.

EXAMPLE I

Preparation of GFRC

A batch of GFRC was prepared using the materials and amounts set forth in Table 1.

TABLE I

| Material | Weight - lbs. | Weight % |
|---|---|---|
| Portland Cement - gray | 368 | 46 |
| Clean, dry and graded sand | 272 | 34 |
| Super Plasticizer | 8 | 1.0 |
| Glass Fibers | 20 | 3.0 |
| Water | 128 | 16 |

The cement, sand, water and plasticizers were blended together using a mixer with a high speed, high shear action. A conventional concrete mixer can be used but a longer mixing time is required to achieve a "creamy" consistency of the premix. The fibers were then added using one of two processes, depending on whether the concrete is poured into the SSM preform or sprayed into the SSM form. When poured into the SSM form, the premix, while still in the blender, had added to it the 12 mm glass fibers (Cem-FIL® 60/2 chopped strands) and mixing continued until the fibers were fully dispersed (about 1–2 minutes). The mix was stiff but easily cast into the SSM form with vibration.

When the spray technique is used, the premix is pumped to a spray head and a continuous strand of glass fiber is fed into a chopping gun wherein it is cut into about 2.5 cm lengths and simultaneously sprayed out with the premix. The fiber and mortar are then compacted together, removing the excess air, by means of rollers or trowels. Due to the higher costs associated with the spray technique, the filling of the SSM forms by pouring the mixture into the preform (casting) with vibration or compaction is preferred. In place of the FRC, the present invention can also be accomplished through the use of concrete that has been reinforced with wire or reinforcing rods. The avoidance of such metal reinforcement is preferred as the labor costs to place the wire or reinforcing rods into the mold can be avoided, as can the potential adhesion problems between the concrete and the metal. GFRC is especially preferred in this invention as it provides excellent edge and corner strength, improved surface detail, high quality finish and is easy to mold into complex shapes.

EXAMPLE II

Preparation of SSM Mold

A ¼ inch thick sheet of Fountainhead SSM (Gray Mist Matrix, pattern # F.M-6-2) was cut to measure 26¼ inches by 32¼ inches. The composite prepared in this Example will be used as a table top measuring 24 by 30 inches with 1 inch edges. The bonding feature was created by using a hand held router with a ⅜ inch dove tail bit. The first bonding feature was started by plunging the router bit into the interior surface of the SSM and was set to cut a groove about ⅛ inch in depth. The shape of the first bonding feature was a rectangle 2½ inches from the edge of the table top. The second bonding feature was also a rectangle 7½ inches from the edge of the table top. The depth of this feature was also about ⅛ inch.

The sheet then had the "V" grooves cut through the use of a table saw. The blade of the table saw was set at 45° and the sheet passed through the saw. A second pass through the saw was accomplished after rotating the sheet 180° so as to result in the "V" groove. It should be understood that various tools and techniques can be used to make these cuts so that a mitered corner will result. In an alternative embodiment, the SSM form can be prepared without the metered corners. All four sides of the sheet were cut so that a 1 inch edge was accomplished. Adhesive was then applied to sides of the "V" grooves. The parts were then joined and held in place by tape. After 30 minutes of cure time, four "T" nuts were glued to the central interior surface of the SSM preform in a pattern that conformed to the bolt pattern of a conventional table stand. Bolts were placed in the "T" nuts and then the GFRC prepared in Example I was then poured into the SSM preform to a depth of about ¾ inch. Vibration was used to compact the concrete and to ensure that the GFRC filled the bonding features.

After seven (7) days of curing, the bolts were removed and the table stand was attached to the FRC/SSM composite and the set upright. After the curing process, a 170 lb. man could place his full weight on the table without damage.

EXAMPLE III

Testing of a FRC/SSM Composite Table

Thermal Cycling

A 24 inch by 30 inch table top prepared as described in Example II, except at dovetail bonding feature, were utilized and were subjected to a thermal cycling test to determine if the composite according to the invention suffered from any problems associated with coefficients of expansion. After storage and for a number of days at 50° F., the table top was placed in a chamber at 30° F. for four (4) hours. The table top was then removed from the chamber and heated to 70° F. The table top was then returned to the 30° F. chamber for twelve (12) hours and thereafter heated to 70° F. and held there for eight (8) hours. No visible defects were apparent. The table top was then placed on two (2) 1 inch supports 29 inches apart and a 170 pound weight was then placed in the center of the table top. No deflection (sagging) of the composite was noted. Further, a careful inspection failed to determine any separation or weakening of the materials.

Deflection Test

A table top as prepared in Example II, except that dovetail bonding feature was utilized, was compared to a table top constructed of the same ¼ inch SSM with the concrete substrate replaced with a ¾ inch thick #40 particle board. The SSM was adhered to the particle board using a flammable, industry-recommended adhesive and method. The comparative table top used a particle board that is recommended by the manufacturer of the SSM. Each table top was supported by 1 inch wood blocks spaced 29 inches apart. A 300 pound weight 15 inches in diameter was placed in the middle of each table top and the deflection was measured. The table top according to the invention deflected 1/16 of an inch while the comparative table top deflected ¼ inch. A 450 pound weight was then placed on each table top. The inventive table top deflected ¼ inch while the particle board table top deflected 7/16 inch. No cracking or separation of the table top according to the invention was noted. This test was similar to ASTM D790-86 and demonstrates that the inventive composite possesses excellent structural strength.

Point Impact Test

The International Cast Polymer Association was promulgated testing and performance standards for solid surface materials. These standards cover requirements for minimum performance pertaining to structure, cleanability and other significant properties. One test described in the point impact test shows a 1½ inch diameter, ½ pound steel ball being dropped from a height of 24 inches to impact on four (4) different areas of the test specimen. The table according to the invention and the particle board backed table top prepared in the previous test, showed no cracks or chips after the test.

The inventor then went one step farther and dropped a 1 pound ball from a height of 12 feet on both specimens. Again, no indentations or cracking was observed. These tests demonstrate that the composite according to the invention has outstanding impact resistance and would thus be useful in commercial and residential settings. Further, this testing confirms that the use of ¼ inch SSM with a FRC substrate can be substituted for the more expensive ½ inch SSM in horizontal applications.

These tests demonstrate that the FRC/SSM composite of the present invention provides a horizontal surface that is extremely strong and highly resistant to impact damage. A major benefit of the composite of this invention is that thinner SSM can be used in a horizontal application and thus greatly reduce the cost of the final article. For example, the table prepared in Example I using ¼ inch SSM cost, including the cost of the GFRC, less than half the cost of a ½ inch SSM table.

In typical fashion, table tops, countertops, sinks, vanities and the like can be made in accordance with this invention and then assembled to produce a low-cost items such as a table or kitchen countertop. While the invention has been illustrated through the use of a table, it should be understood that the invention is also applicable to other types of furniture and articles such as bathroom vanities, bench seats and the like.

Industrial Applicability

Architects and restaurant managers are constantly searching for low cost and long lived horizontal surfaces for use as table tops and countertops. The Corian® type of SSM has many desirable properties, however, the costs associated with its use often preclude its applications. Attempts to bind thinner sections of SSM to various substrates has met with limited success and, as such, there exists a need for an improved SSM composite for horizontal application.

The inventor herein has devised and reduced to practice a unique combination of concrete and SSM to overcome the shortcomings of each material. Through novel and unobvious techniques and structures, the inventor has arrived at a method for producing a FRC/SSM composite that meets the various needs of horizontal applications in an easy and cost-effective manner.

While the form and process described herein constitutes a preferred embodiment of the invention, it is to be understood that the invention is not limited thereto, and that changes may be made therein without departing from the scope of the invention which is defined in the appended claims.

We claim:

1. A composite comprising a fiber reinforced concrete (FRC) substrate and a preformed solid surface material (SSM) mold member wherein said member comprises an exterior surface, an interior surface and at least one bonding feature selected from dovetails and T's.

2. The composite of claim 1 wherein said FRC comprise glass fibers.

3. The composite of claim 1 wherein said FRC substrate fills said at least one bonding feature selected from dovetails and T's.

4. The composite of claim 2 wherein said substrate is at least ⅜ inch in thickness.

5. The composite according to claim 1 wherein said SSM member is less than ½ inch but greater than 1/16 inch in thickness.

6. The composite according to claim 5 wherein said SSM member is less than 3/16 inch in thickness.

7. The composite according to claim 6 wherein said SSM member is about ¼ inch in thickness.

8. The composite according to claim 2 wherein said glass fibers are resistant to alkali.

9. The composite according to claim 8 wherein said FRC comprises:

a) 20–50% by weight cement;

b) 10–20% by weight water;

c) 35–55% by weight fine aggregate; and d) 0.1–10% by weight glass fibers.

10. The composite according to claim 9 wherein said FRC substrate is at least ⅜ inch in thickness.

11. The composite according to claim 10 wherein said FRC substrate is at least ½ inch in thickness.

* * * * *